United States Patent
Bourdeau

[11] Patent Number: 6,133,785
[45] Date of Patent: Oct. 17, 2000

[54] FALSE CARRIER LOCK RECEIVER AND ASSOCIATED METHODS FOR DETECTION

[75] Inventor: Richard Bourdeau, St. Laurent, Canada

[73] Assignee: Harris Corporation, Melbourne, Fla.

[21] Appl. No.: 09/343,377

[22] Filed: Jun. 30, 1999

[51] Int. Cl.[7] .............................. H03D 3/00; H04L 27/38; H03L 7/095
[52] U.S. Cl. ........................ 329/304; 329/306; 329/310; 375/261; 375/326; 375/329; 375/344
[58] Field of Search ........................... 329/304, 306–309, 329/310; 375/261, 326, 329–332, 344, 346

[56] References Cited

U.S. PATENT DOCUMENTS

| | | | |
|---|---|---|---|
| 4,866,395 | 9/1989 | Hostetter | 329/309 |
| 5,278,637 | 1/1994 | Naimpally | 358/12 |
| 5,363,414 | 11/1994 | Muto | 375/94 |
| 5,381,450 | 1/1995 | Lane | 375/94 |
| 5,430,487 | 7/1995 | Naimpally | 348/429 |
| 5,440,268 | 8/1995 | Taga et al. | 329/308 |
| 5,471,508 | 11/1995 | Koslov | 375/344 |
| 5,519,356 | 5/1996 | Greenberg | 329/304 |
| 5,784,686 | 7/1998 | Wu et al. | 455/45 |
| 5,838,737 | 11/1998 | Yamaguchi et al. | 375/331 |

Primary Examiner—David Mis
Attorney, Agent, or Firm—Allen, Dyer, Doppelt, Milbrath & Gilchrist, P.A.

[57] ABSTRACT

A receiver includes a demodulator and a false carrier lock detector circuit for a quadrature amplitude modulated (QAM) signal. The demodulator includes a controllable oscillator and an offset frequency generator for generating an offset frequency for the controllable oscillator to lock to a carrier of the QAM signal. The demodulator is susceptible to false carrier locking responsive to the offset frequency being substantially equal to the symbol rate divided by four or an integer multiple thereof. The receiver further includes the false carrier lock detector circuit including a first detector for detecting consecutive symbols spaced 180° apart, and a second detector for determining whether an intervening sample between the consecutive symbols is outside a predetermined distance from the origin. The first and second detectors cooperate to determine false carrier locking based upon the intervening sample being outside a predetermined distance from the origin.

27 Claims, 5 Drawing Sheets

FALSE CARRIER LOCK RECEIVER AND ASSOCIATED METHODS FOR DETECTION

FIELD OF THE INVENTION

The present invention relates to the field of communications, and, more particularly, to radio communications using quadrature amplitude modulation (QAM) signals.

BACKGROUND OF THE INVENTION

Quadrature amplitude modulation (QAM) is widely used for digital data transmission over radio links. With the new applications in inter-active technologies such as Digital TV and the Internet, QAM as a communications technology, will continue to be integrated into consumer electronic devices. Indeed, high definition television (HDTV) signals will be transmitted as compressed digitized data using QAM.

QAM transmits data as a sequence of two-dimensional complex symbols, i.e. with both in-phase and quadrature components. Each symbol adopts a specific pre-defined value based upon the data it represents. A set of all of the values available for transmission defines a character set which forms a constellation when graphically plotted on a two-dimensional basis.

The size and shape of the constellation depends upon the number of discrete values in the set and their spatial location in the constellation. The constellation proposed for use in broadcasting HDTV data contains, e.g., 16, 32 or 64 values.

To receive a QAM signal, a QAM demodulator within a receiver performs the functions of timing recovery, equalization and carrier recovery. Carrier recovery creates a reference carrier for determination of in-phase (i) and quadrature modulated (q) components, both in terms of frequency and phase, such that the received demodulated symbols do not rotate when the carrier is locked. It is the carrier signal that is quadrature modulated by the symbols and then transmitted to the receiver. Carrier recovery must be able to properly function in the presence of varying frequency offsets, drift and/or jitter that often occurs between a QAM transmitter and the receiver.

Through carrier recovery, a carrier frequency offset value is typically translated into a direct current (DC) value or digitized value that is used as a control input to a voltage or numerically controlled oscillator within a phase-locked loop. The output of this oscillator, being locked in frequency and phase to the reference carrier signal, is then used to extract, for example, baseband quadrature modulated information from the received signal.

In a QAM demodulator, a circuit is used to detect that the demodulator is locked, i.e., that the carrier and clock recovery loops are synchronized. This circuit is often called an Eye Quality Monitor ("EQM"). If it detects that the demodulator is unlocked, then the demodulator enters the acquisition mode and the carrier recovery circuit searches for the right carrier frequency, for example, by the use of a sweep circuit.

A carrier recovery circuit for a QAM demodulator is disclosed, for example, in U.S. Pat. No. 5,471,508 to Koslov. The carrier recovery circuit is operated in two modes: an acquisition mode to first attain an initial carrier lock, during which reduced constellation slicing is used; and a tracking (or lock) mode, during which full slicing is used to accurately track variations in frequency and phase that may occur to the carrier while the circuit remains locked.

Detecting the constellation size of a QAM signal is disclosed in U.S. Pat. No. 5,381,450. The probability density function of a received QAM signal is analyzed to determine the constellation size, e.g., 4, 16, 32, etc.

A problem can arise with the standard algorithms in that if the voltage controlled oscillator ("VCO") in the carrier recovery circuit oscillates with an offset frequency of exactly $R_s/4$ ($R_s/4$ is the Symbol Rate), or a multiple of $R_s/4$, the demodulator would be erroneously declared locked. This is called a false-lock condition. It can occur when the symbol rate of the system is low, so that $R_s/4$ is inside the locking range of the carrier recovery.

A conventional way to perform the EQM function is to examine the received constellation (FIG. 1). The received signal is sampled once per symbol at the optimum sampling instant, and if there are too many non-valid symbols during a certain period, the demodulator is declared unlocked. If the VCO in the carrier recovery oscillates with an offset of exactly $R_s/4$, then the constellation rotates at $R_s/4$. Accordingly, between each sample, it moves by exactly one quadrant and the received symbols are declared valid.

SUMMARY OF THE INVENTION

In view of the foregoing background, it is therefore an object of the invention to provide accurate carrier recovery for a QAM signal.

It is a further object of the invention to increase the reliability of a QAM demodulator circuit by detecting a false-lock condition.

These and other objects, features and advantages in accordance with the present invention are provided by a receiver for a quadrature amplitude modulated (QAM) signal comprising a demodulator for generating, from the QAM signal, received symbols about an origin at a symbol rate. The demodulator comprises a controllable oscillator and an offset frequency generator for generating an offset frequency for the controllable oscillator to lock to a carrier of the QAM signal. The demodulator is susceptible to false carrier locking responsive to the offset frequency being substantially equal to the symbol rate divided by four or an integer multiple thereof.

In accordance with the invention, the receiver further includes a false carrier lock circuit comprising a first detector for detecting consecutive symbols spaced 180° apart, and a second detector cooperating with the first detector for determining false carrier locking further based upon an intervening sample between the consecutive symbols being outside a predetermined distance from the origin. Thus, the receiver can determine a false carrier lock condition and re-initialize the carrier locking operation.

The false carrier lock circuit may comprise an output circuit for generating a false-lock signal responsive to the first and second detectors. Such an output circuit preferably includes at least one logic gate connected to outputs of the first and second detectors, an averager for receiving pulses from the at least one logic gate, and a comparator for comparing an output of the averager to a threshold to generate the false-lock signal.

Additionally, the second detector preferably processes samples at twice the symbol rate. Also, the controllable oscillator and offset frequency generator define a locking frequency range so that for relatively low symbol rates, the symbol rate divided by four is within the locking frequency range. The demodulator may include a timing recovery circuit, and the receiver may include a tuner, an analog-digital converter connected between the tuner and the demodulator, and a decoder connected to the demodulator.

According to a method aspect of the invention, steps are provided for detecting false carrier locking of a demodulator for a quadrature amplitude modulated (QAM) signal. The steps include generating, from the QAM signal, received symbols about an origin at a symbol rate, and generating an offset frequency for a controllable oscillator of the demodulator to lock to a carrier of the QAM signal.

The demodulator is susceptible to false carrier locking responsive to the offset frequency being substantially equal to the symbol rate divided by four or an integer multiple thereof. Further, the method includes: detecting whether consecutive received symbols are spaced 180° apart; detecting whether an intervening sample between the consecutive received symbols is outside a predetermined distance from the origin; and determining false carrier locking based upon the consecutive received symbols being 180° apart and the intervening sample being outside the predetermined distance from the origin.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
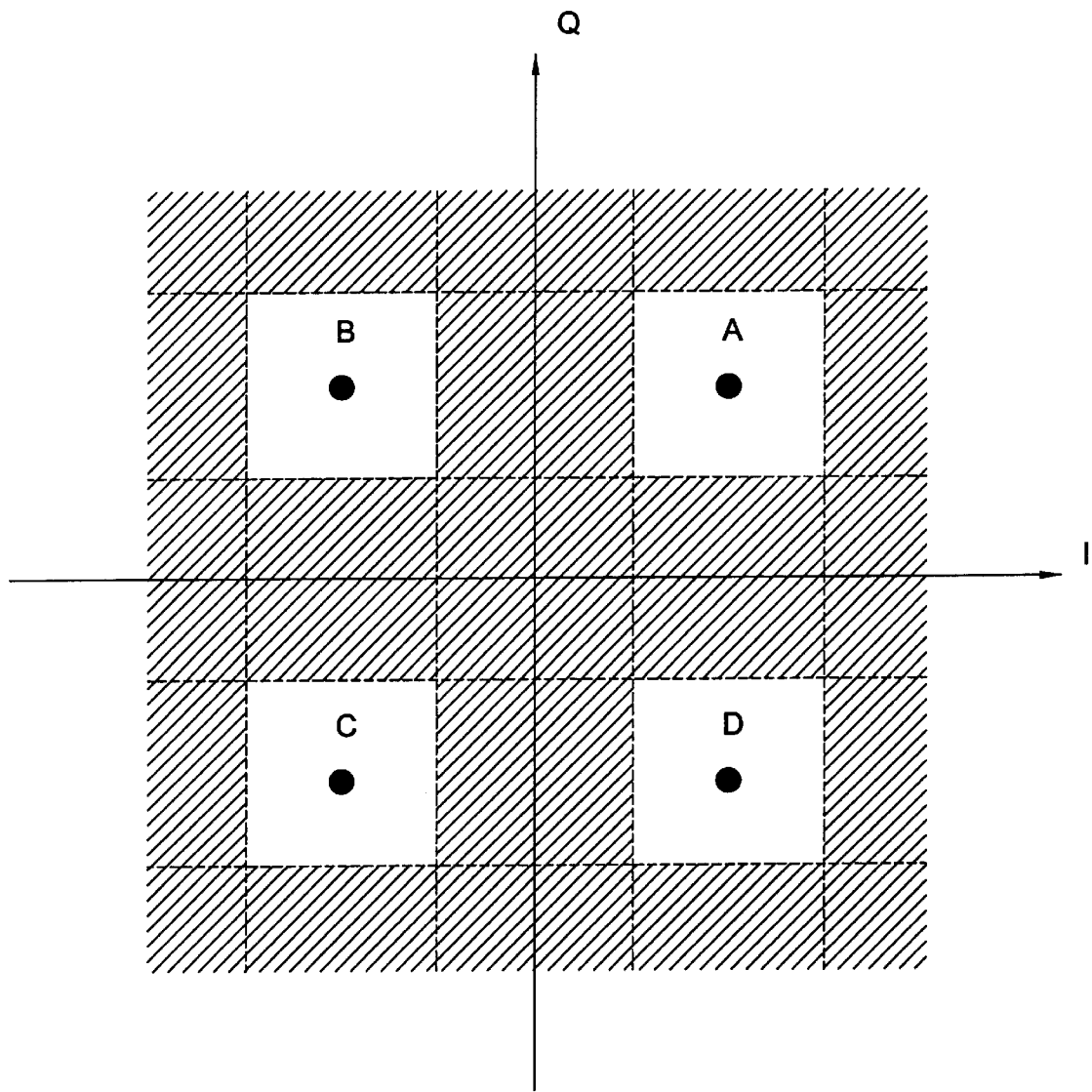
FIG. 1 is a constellation plot illustrating a prior art method of monitoring the received QAM signal.
Figure 2:
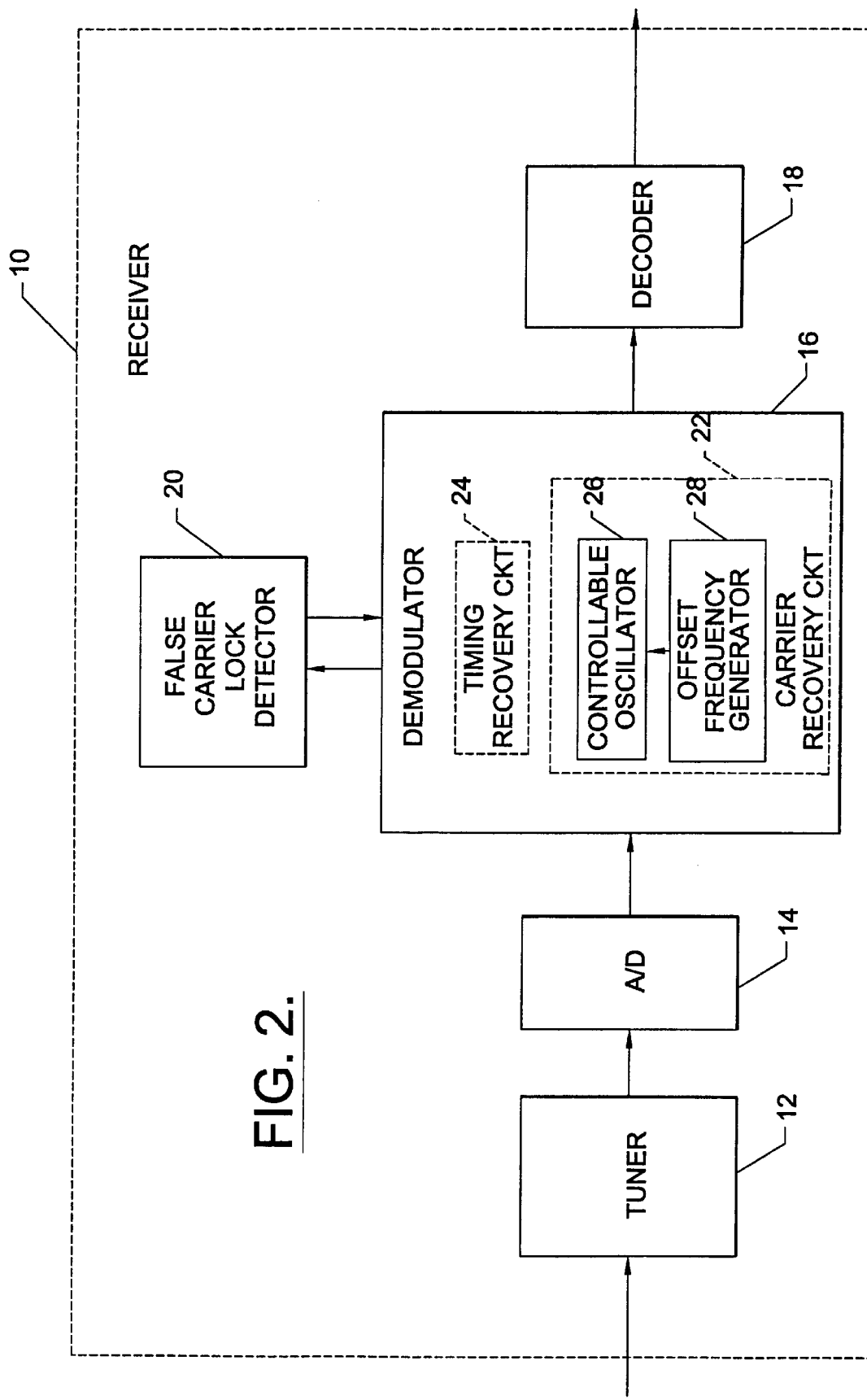
FIG. 2 is a simplified schematic diagram of a receiver including a false carrier lock detector in accordance with the present invention.

The invention is directed to a false carrier lock detector for a QAM demodulator circuit and associated methods which detect that the constellation rotates at $R_s/4$ (or a multiple of $R_s/4$) and that the QAM demodulator circuit is falsely locked. The basic components of a receiver 10 including a false carrier lock detector in accordance with the present invention will now be described with reference to FIGS. 2 and 3. The receiver 10 includes a tuner 12 and an analog-digital converter 14 for initial processing of a received QAM signal. The receiver 10 also includes a demodulator 16 and a decoder 18 for subsequent processing and outputting of the information of the received QAM signal as will be readily appreciated by those skilled in the art.

The demodulator 16 generates, from the QAM signal, received symbols about an origin at a symbol rate. As would readily be understood by those skilled in the art, a typical demodulator 16 includes a carrier recovery circuit 22 and a timing recovery circuit 24. As is conventional, the timing circuit 24 generates clock pulses to ensure that sampling occurs at a predetermined rate, e.g. the symbol rate. Furthermore, the carrier recovery circuit 22 performs carrier recovery through a phase-locked loop (PLL) in which a reference carrier is generated for use in de-rotating incoming symbols.

The carrier recovery circuit 22 includes a * controllable oscillator 26, such as a voltage controlled oscillator (VCO), and an offset frequency generator 28 for generating an offset frequency for the controllable oscillator 26 to lock to a carrier of the QAM signal. Unfortunately, the demodulator 16 is susceptible to false carrier locking responsive to the offset frequency being substantially equal to the symbol rate ($R_s$) divided by four ($R_s/4$), or an integer multiple thereof. The controllable oscillator 26 and offset frequency generator 28 define a locking frequency range. The false carrier locking can occur when the symbol rate is relatively low, so that $R_s/4$ is within the locking frequency range.

Figure 4:
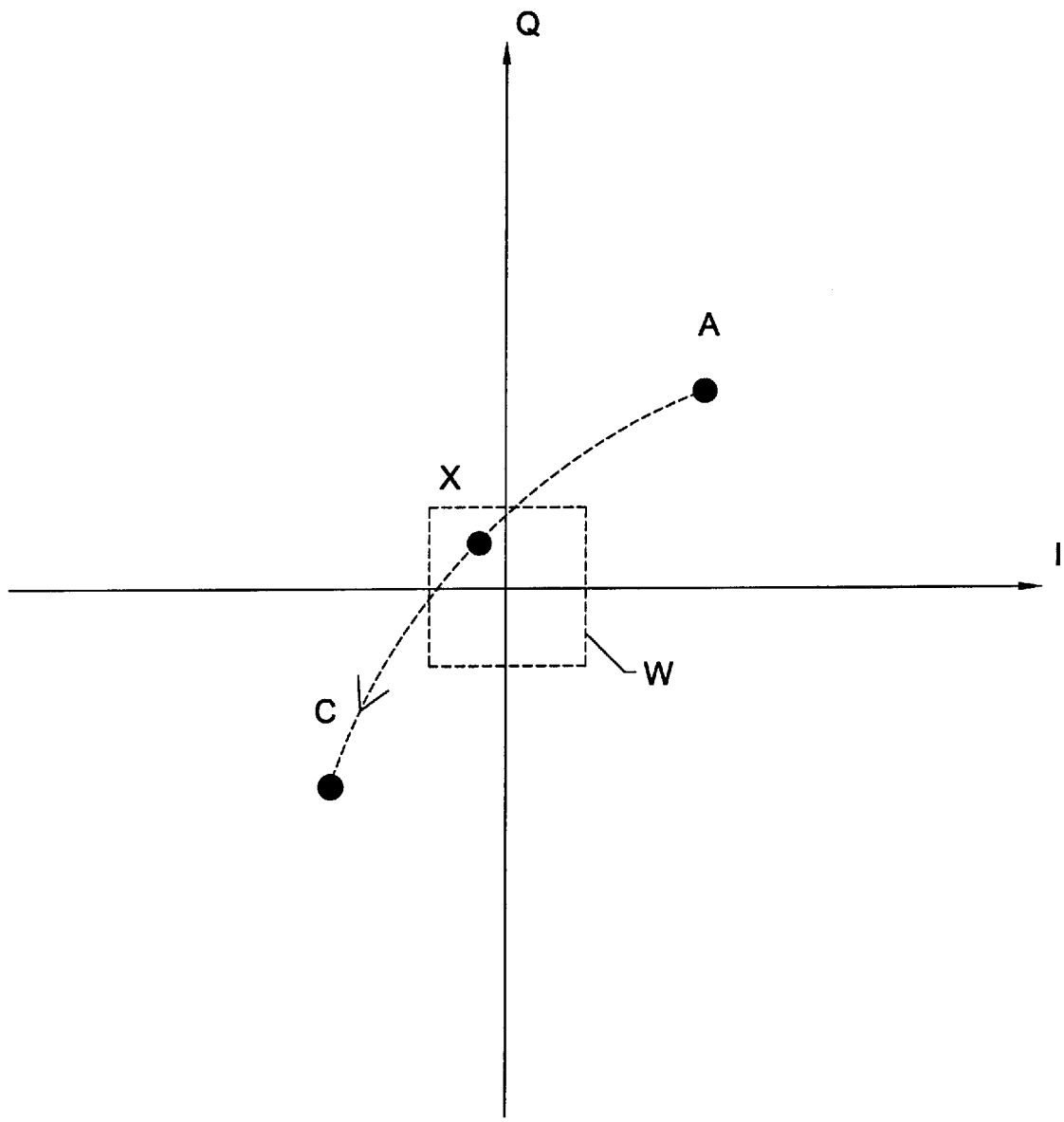
FIGS. 4 and 5 are constellation plots illustrating the method in accordance with the present invention.
Figure 5:
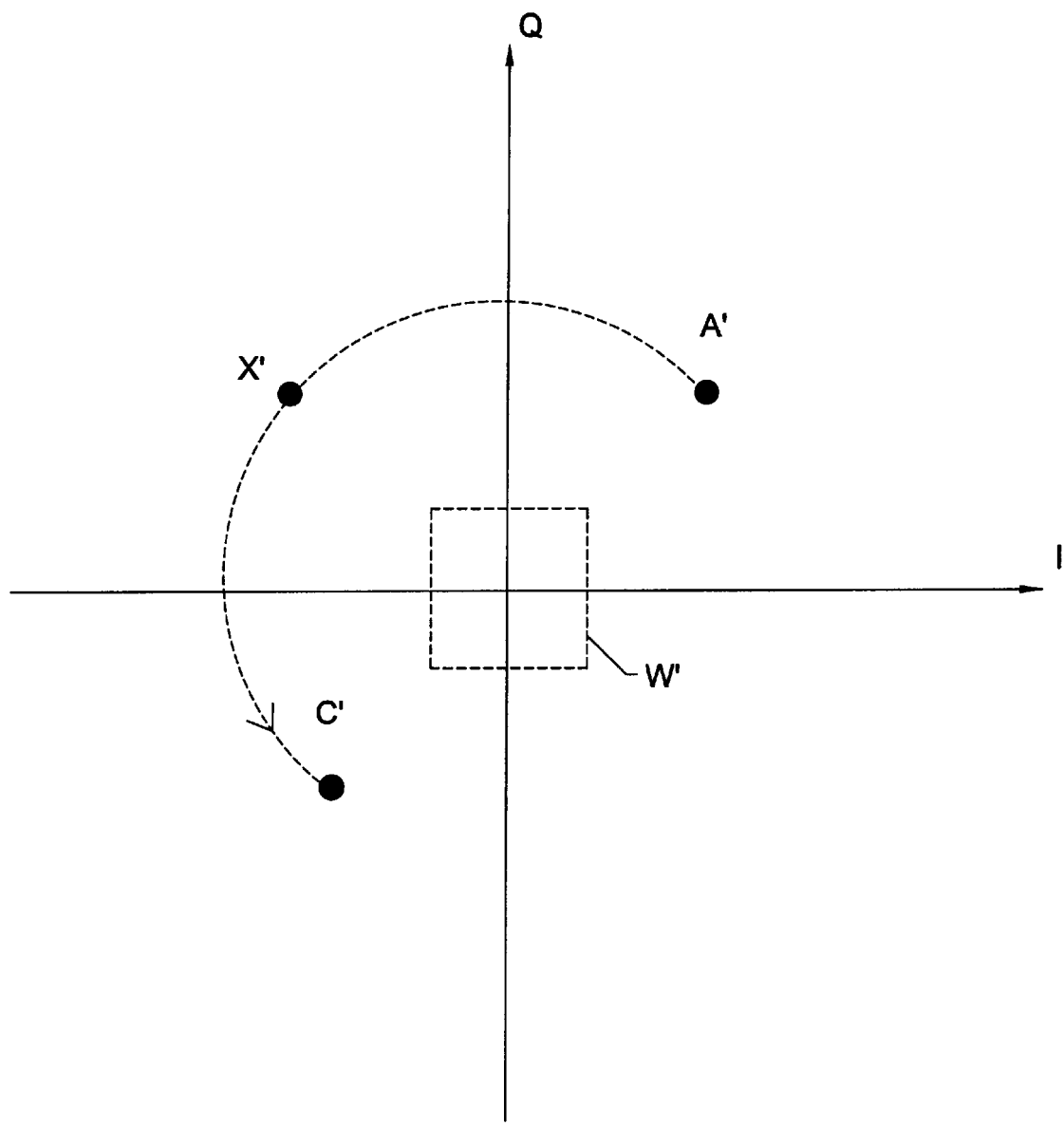

Therefore, the receiver 10 includes a false carrier lock detector 20 to detect a false-lock condition of the demodulator 16. The false carrier lock detector 20 of the invention samples the constellation at twice the symbol rate. In the normal case, when the constellation is not rotating, if two consecutive received symbols are 180° apart, the sample taken between the two symbols will be close to the origin. This is shown in FIG. 4, where A and C indicate the two consecutive symbols, and X represents the intervening sample which is illustratively inside the window W around the origin. When the constellation is rotating at $R_s/4$ or an integer multiple thereof, however, if two consecutive received symbols A' and B' are 180° apart, the intervening sample X' taken between the two symbols will not be close to the origin, as shown in FIG. 5. Instead the intervening sample X' will be outside the window W'.

Referring again more particularly to FIG. 3, in the false carrier lock detector 20 of the invention, the I and Q baseband signals coming from the demodulator 16 are applied to a 180° detector circuit 30 that detects that two consecutive symbols are 180° apart. The construction of such a circuit is well within the knowledge of those skilled in the art and requires no further discussion herein.

Also, the I and Q baseband signals are applied to a second or near origin detector circuit 32 that detects whether an intervening sample is inside a window around the origin. The construction of the near origin detector circuit 32 will also be readily appreciated by those skilled in the art without any further discussion herein. If two consecutive symbols A' and B' are 180° apart and the intervening sample X' is not close to the origin (FIG. 5), a pulse is presented at the output of a logic gate 34, for example, an AND gate with an inverted input coupled to the near origin detector 32. Those pulses are counted or integrated over a predetermined time by an averaging circuit or averager 36. If the output of the averager 36 is higher than a predetermined threshold, a false-lock condition is indicated as an output at the output of comparator circuit 38.

The averager 36 and the comparator 38 can be either digital or analog, and the averager may include an RC lowpass filter. The false lock detector 20 of the present invention can be used for any QAM modulation, e.g., 4, 16, 32, 64, 128, or 256 QAM as will be readily appreciated by those skilled in the art.

According to a method aspect of the invention, steps are provided for detecting false carrier locking of the demodulator 16. The steps include generating, from the QAM signal, received symbols about an origin at a symbol rate, and generating an offset frequency for a controllable oscillator 26 of the demodulator 16 to lock to a carrier of the QAM signal. As discussed above, the demodulator 16 is unfortunately susceptible to false carrier locking responsive to the offset frequency being substantially equal to $R_s/4$ or an integer multiple thereof.

Also, the method preferably includes the step of processing samples at twice the symbol rate. Further, the method includes: detecting whether consecutive received symbols are spaced 180° apart; detecting whether an intervening sample between the consecutive received symbols is outside a predetermined distance from the origin; and determining false carrier locking based upon the consecutive received symbols A' and B' being 180° apart and the intervening sample X' being outside the predetermined distance an window W' from the origin, as illustrated in FIG. 5.

Figure 3:
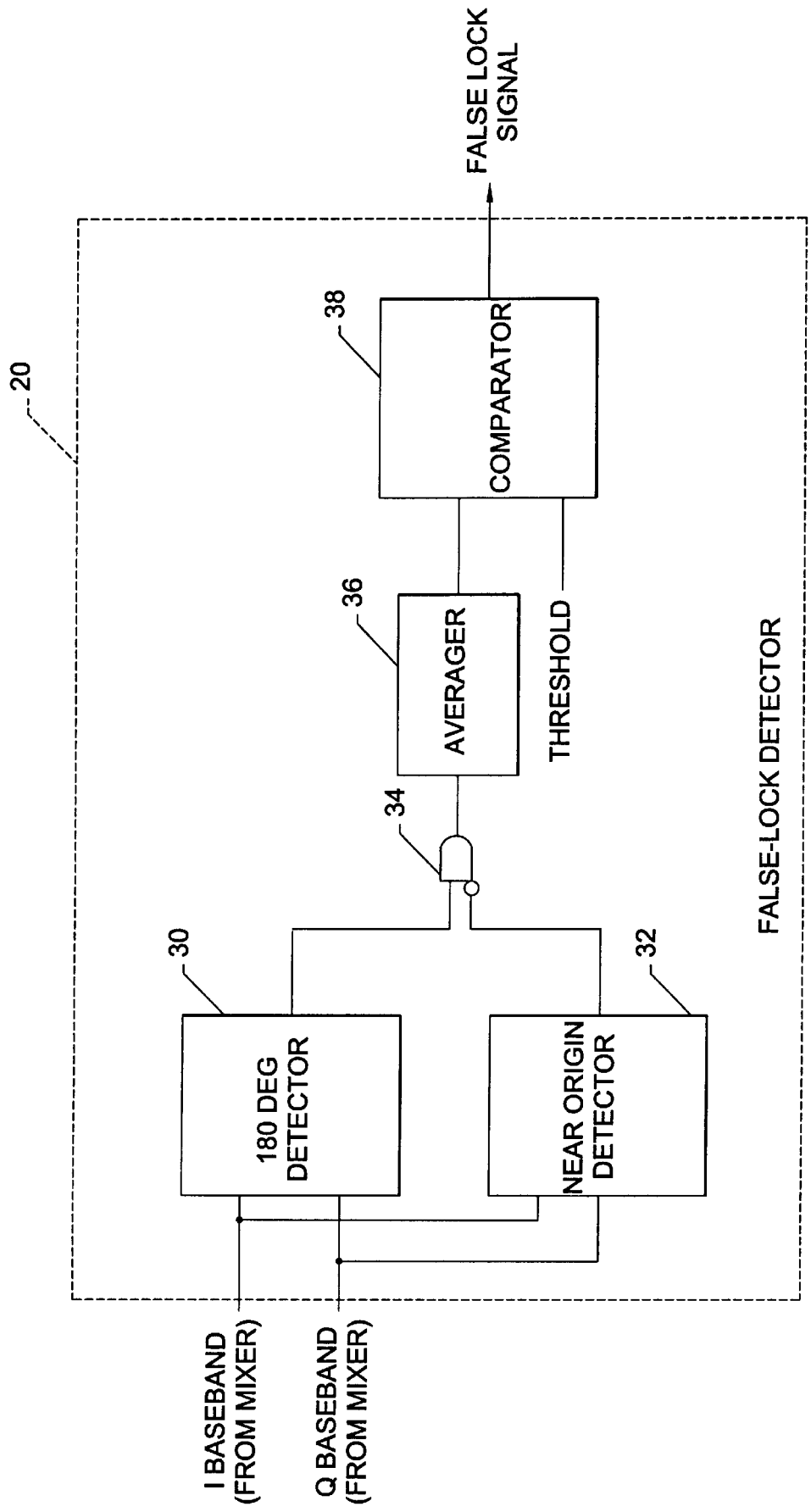
FIG. 3 is a more detailed schematic diagram of a false carrier lock detector as shown in FIG. 2.

The method may include the step of generating a false-lock signal based upon the false carrier locking determination. Referring to FIG. 3, generating this false-lock signal preferably includes the steps of: generating pulses based upon the consecutive received symbols being 180° apart and the intervening sample being outside the predetermined distance from the origin; generating an average of the pulses over a predetermined time; and comparing the average with a threshold to generate the false-lock signal.

The receiver 10 including the false locking detector circuit 20 in accordance with the present invention can be used for a wide range of radio frequencies, and is particularly beneficial for microwave radio frequencies. Accordingly, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A receiver for a quadrature amplitude modulated (QAM) signal comprising:
   a demodulator for generating, from the QAM signal, received symbols about an origin at a symbol rate, said demodulator comprising a controllable oscillator and an offset frequency generator for generating an offset frequency for said controllable oscillator to lock to a carrier of the QAM signal;
   said demodulator being susceptible to false carrier locking responsive to the offset frequency being substantially equal to the symbol rate divided by four or an integer multiple thereof; and
   a false carrier lock circuit comprising a first detector for detecting consecutive symbols spaced 180° apart, and a second detector cooperating with said first detector for determining false carrier locking further based upon an intervening sample between the consecutive symbols being outside a predetermined distance from the origin.

2. A receiver according to claim 1 wherein said false carrier lock circuit comprises an output circuit for generating a false lock signal responsive to said first and second detectors.

3. A receiver according to claim 2 wherein said output circuit comprises:
   at least one logic gate connected to outputs of said first and second detectors;
   an averager for receiving pulses from said at least one logic gate; and
   a comparator for comparing an output of said averager to a threshold to generate the false lock signal.

4. A receiver according to claim 1 wherein said second detector processes samples at twice the symbol rate.

5. A receiver according to claim 1 wherein said controllable oscillator and offset frequency generator define a locking frequency range so that for relatively low symbol rates, the symbol rate divided by four is within the locking frequency range.

6. A receiver according to claim 1 wherein said demodulator further comprises a timing recovery circuit.

7. A receiver according to claim 1 further comprising:
   a tuner;
   an analog-digital converter connected between said tuner and said demodulator; and
   a decoder connected to said demodulator.

8. A receiver for a quadrature amplitude modulated (QAM) signal comprising:
   a demodulator for generating, from the QAM signal, received symbols about an origin at a symbol rate; and
   a false carrier lock circuit comprising a first detector for detecting consecutive symbols spaced 180° apart, and a second detector cooperating with said first detector for determining false carrier locking of said demodulator further based upon an intervening sample between the consecutive symbols being outside a predetermined distance from the origin.

9. A receiver according to claim 8 wherein said false carrier lock circuit comprises a output circuit for generating a false lock signal responsive to said first and second detectors.

10. A receiver according to claim 9 wherein said output circuit comprises:
    at least one logic gate connected to outputs of said first and second detectors;
    an averager for receiving pulses from said at least one logic gate; and
    a comparator for comparing an output of said averager to a threshold to generate the false lock signal.

11. A receiver according to claim 8 wherein said second detector processes samples at twice the symbol rate.

12. A receiver according to claim 8 wherein said demodulator comprises a controllable oscillator and an offset frequency generator for generating an offset frequency for said controllable oscillator to lock to a carrier of the QAM signal; and wherein said controllable oscillator and offset frequency generator define a locking frequency range so that for relatively low symbol rates, the symbol rate divided by four is within the locking frequency range.

13. A receiver according to claim 8 wherein said demodulator further comprises a timing recovery circuit.

14. A receiver according to claim 8 further comprising:
    a tuner;
    an analog-digital converter connected between said tuner and said demodulator; and
    a decoder connected to said demodulator.

15. A false carrier lock circuit for a quadrature amplitude modulated (QAM) signal comprising:
    a first detector for detecting consecutive received symbols of the QAM signal being 180° spaced apart; and
    a second detector for determining whether an intervening sample between the consecutive received symbols is outside a predetermined distance from an origin;
    said first and second detectors cooperating to detect false carrier locking based upon the consecutive received symbols being 180° apart and the intervening sample being outside the predetermined distance from the origin.

16. A false carrier lock circuit according to claim 15 further comprising a output circuit for generating a false lock signal responsive to said first and second detector.

17. A false carrier lock circuit according to claim 16 wherein said output circuit comprises:
- at least one logic gate connected to outputs of said first and second detectors;
- an averager for receiving pulses from said at least one logic gate; and
- a comparator for comparing an output of said averager to a threshold to generate the false lock signal.

18. A false carrier lock circuit according to claim 15 wherein said second detector processes samples at twice the symbol rate.

19. A false carrier lock circuit according to claim 15 wherein said 180° detector and said near origin detector each receive I and Q baseband signals generated from the QAM signal.

20. A method for detecting false carrier locking of a demodulator for a quadrature amplitude modulated (QAM) signal, the method comprising the steps of:
- generating, from the QAM signal, received symbols about an origin at a symbol rate;
- generating an offset frequency for a controllable oscillator of the demodulator to lock to a carrier of the QAM signal, the demodulator being susceptible to false carrier locking responsive to the offset frequency being substantially equal to the symbol rate divided by four or an integer multiple thereof;
- detecting whether consecutive received symbols are spaced 180° apart;
- detecting whether an intervening sample between the consecutive received symbols is outside a predetermined distance from the origin; and
- determining false carrier locking based upon the consecutive received symbols being 180° apart and the intervening sample being outside the predetermined distance from the origin.

21. A method according to claim 20 further comprising the step of generating a false lock signal based upon the false carrier locking determination.

22. A method according to claim 21 wherein the step of generating a false lock signal comprises the steps of:
- generating pulses based upon the consecutive received symbols being 180° apart and the intervening sample being outside the predetermined distance from the origin;
- generating an average of the pulses over a predetermined time; and
- comparing the average with a threshold to generate the false lock signal.

23. A method according to claim 20 further comprising the step of sampling the symbols at twice the symbol rate.

24. A method for detecting false carrier locking for a quadrature amplitude modulated (QAM) signal, the method comprising the steps of:
- detecting whether consecutive received symbols of the QAM signal are spaced 180° apart;
- detecting whether an intervening sample between the consecutive received symbols is outside a predetermined distance from an origin; and
- determining false carrier locking based upon the consecutive received symbols being 180° apart and the intervening sample being outside the predetermined distance from the origin.

25. A method according to claim 24 further comprising the step of generating a false lock signal based upon the false carrier locking determination.

26. A method according to claim 25 wherein the step of generating a false lock signal comprises the steps of:
- generating pulses based upon the consecutive received symbols being 180° apart and the intervening sample being outside the predetermined distance from the origin;
- generating an average of the pulses over a predetermined time; and
- comparing the average with a threshold to generate the false lock signal.

27. A method according to claim 24 further comprising the step of processing samples at twice the symbol rate.

* * * * *

UNITED STATES PATENT AND TRADEMARK OFFICE
CERTIFICATE OF CORRECTION

PATENT NO. : 6,133,785
DATED : October 17, 2000
INVENTOR(S) : Richard Bourdeau

It is certified that error appears in the above-identified patent and that said Letters Patent is hereby corrected as shown below:

Column 2, Line 8    Delete: "($R_s/4$ is the Symbol Rate)"
                    Insert -- ($R_s$ is the Symbol Rate) --

Column 4, Line 1    Delete: "*"

Signed and Sealed this

Eighth Day of May, 2001

NICHOLAS P. GODICI

Attest:

Attesting Officer    Acting Director of the United States Patent and Trademark Office